US009139368B2

United States Patent
Viilo

(10) Patent No.: US 9,139,368 B2
(45) Date of Patent: Sep. 22, 2015

(54) VERTICAL CONVEYOR

(75) Inventor: Keijo Viilo, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 0 days.

(21) Appl. No.: 14/398,167

(22) PCT Filed: May 7, 2012

(86) PCT No.: PCT/FI2012/050439
§ 371 (c)(1),
(2), (4) Date: Oct. 31, 2014

(87) PCT Pub. No.: WO2013/167790
PCT Pub. Date: Nov. 14, 2013

(65) Prior Publication Data
US 2015/0122616 A1 May 7, 2015

(51) Int. Cl.
 B65G 15/16 (2006.01)
 B65G 47/58 (2006.01)
 B02C 21/02 (2006.01)
 B02C 23/02 (2006.01)
 B07B 1/00 (2006.01)

(52) U.S. Cl.
 CPC ............... *B65G 15/16* (2013.01); *B02C 21/02* (2013.01); *B02C 23/02* (2013.01); *B07B 1/00* (2013.01); *B65G 47/58* (2013.01); *B65G 2201/045* (2013.01); *B65G 2812/02257* (2013.01)

(58) Field of Classification Search
 CPC ........ B65G 15/16; B65G 15/14; B65G 15/18; B65G 47/56; B65G 47/57; B65G 47/58; B65G 2201/045; B65G 2812/02257; B07B 1/00; B02C 23/02; B02C 21/02
See application file for complete search history.

(56) References Cited

U.S. PATENT DOCUMENTS

| 2,257,351 | A | | 9/1941 | Silver | |
|---|---|---|---|---|---|
| 4,195,724 | A | * | 4/1980 | Janitsch | 198/626.2 |
| 4,585,118 | A | * | 4/1986 | Plaut | 198/840 |
| 4,645,035 | A | * | 2/1987 | Bavis | 186/37 |

(Continued)

FOREIGN PATENT DOCUMENTS

| EP | 0 249 084 A1 | 12/1987 |
|---|---|---|
| EP | 0 626 326 A2 | 11/1994 |
| GB | 1 513 992 A | 6/1978 |

OTHER PUBLICATIONS

International Search Report dated Feb. 4, 2013.
Written Opinion dated Feb. 4, 2013.

*Primary Examiner* — Leslie A Nicholson, III
*Assistant Examiner* — Keith R Campbell
(74) *Attorney, Agent, or Firm* — Andrus Intelletual Property Law, LLP

(57) ABSTRACT

A conveyor for conveying mineral material vertically includes a conveyor frame; at least two conveyor main rolls or pairs of conveyor main pulleys, a plurality of conveyor guide rolls or conveyor guide pulleys and a first and a second endless conveyor belt. The main rolls or pulleys are arranged on top of each other and the guide rolls or pulleys are arranged outside each conveyor main roll or pulley at a circumference of a circle. The endless conveyor belts alternate between being moved on either a main roll or a pair of main pulleys or on a group of guide rolls or guide pulleys. The endless conveyor belts are arranged to be moved at a speed that any material being conveyed stays in contact with the surface of either the first or the second endless conveyor belts when being moved on a the conveyor guide rolls or pulleys.

9 Claims, 4 Drawing Sheets

(56) References Cited

U.S. PATENT DOCUMENTS

| | | |
|---|---|---|
| 4,951,806 A | 8/1990 | Schwing et al. |
| 5,069,292 A * | 12/1991 | Baker et al. ............... 171/1 |
| 5,320,471 A | 6/1994 | Grathoff |
| 5,392,897 A * | 2/1995 | Akesaka ............... 198/604 |
| 2005/0121295 A1* | 6/2005 | Niklewski ............... 198/603 |

\* cited by examiner

VERTICAL CONVEYOR

CROSS-REFERENCE TO RELATED APPLICATIONS

This application claims priority to PCT/FI2012/050439, filed May 7, 2012, and published in English on Nov. 14, 2013 as publication number WO 2013/167790, incorporated herein by reference.

TECHNICAL FIELD

The invention relates generally to belt conveyors. The invention relates particularly, though not exclusively, to a vertical conveyor.

BACKGROUND ART

In processing of for example mineral material, it is often required that material is hoisted to a certain height with a conveyor.

A belt conveyor with a smooth belt can be used up to a slope of approximately 20 degrees. Should the conveyor belt have ridges or grooves, the slope angle can be somewhat larger. In any case, in order to achieve a certain height, an approximately threefold horizontal conveyor length is required.

A conveyer with a belt having pockets or containers, as well as elevators, can be used for vertical lifting but operate in a batch-like manner and require tedious service operations in addition to larger costs.

In publication U.S. Pat. No. 4,598,875 there is presented a belt conveyor having a large diameter curve in order to hoist the material to a certain height and throw it off the conveyor. The material stays on the belt due to centrifugal force.

In the publication US2005/121295 A1 there is presented a belt conveyor having a first belt with a first width and a second belt with a second width. The first and second belts are supported on a roll having two diameters, and the material is dropped from the first belt to the second. The second belt, supported on the smaller diameter of the roll has a significantly lower speed and smaller width.

SUMMARY

According to a first example aspect of the invention there is provided a conveyor for conveying mineral material vertically comprising
  a conveyor frame;
  at least two conveyor main rolls or at least two pairs of conveyor main pulleys being fitted rotatably in connection with the conveyor frame;
  a plurality of conveyor guide rolls or conveyor guide pulleys, each guide roll or pulley being fitted rotatably in connection with the conveyor frame; and
  a first and a second endless material transport means being arranged to be moved on the conveyor main rolls and on the conveyor guide rolls, characterized in that the
  conveyor main rolls or pairs of conveyor main pulleys are arranged on top of each other at a vertical distance from each other in such a way that the horizontal distance between the conveyor main rolls or pairs of conveyor main pulleys is such that at least a part of the conveyor main rolls or conveyor main pulleys is substantially on a same vertical line;
  the conveyor guide rolls or conveyor guide pulleys are arranged outside each conveyor main roll or main pulley at a circumference of a circle having its centre point on the rotation axis of the corresponding conveyor main roll or main pulley and having a diameter larger than that of the conveyor main roll or main pulley;
  the first and second endless material transport means are arranged to alternate between being moved first on either a conveyor main roll or a pair of conveyor main pulleys or on a group of conveyor guide rolls or guide pulleys and then respectively on a next group of conveyor guide rolls or guide pulleys or a next conveyor main roll or a pair of conveyor main pulleys; and
  the first and second endless material transport means are arranged to be moved at such a speed that any material being conveyed stays in contact with the surface of either the first or the second endless material transport means when being moved on a group of conveyor guide rolls or guide pulleys.

At least one guiding member may be provided between the first and second endless material transport means between a path of the material to be conveyed and the conveyor guide rolls or guide pulleys.

The at least one guiding member may be supported at the ends of a number of guide rolls or guide pulleys.

The first and second endless material transport means may be arranged to be moved at the same speed.

The first and second endless material transport means may have the same width.

According to a second example aspect of the invention there is provided a processing plant for mineral material comprising a conveyor according to the first example aspect of the invention.

The processing plant may comprise a crusher. The crusher may be a mobile crusher.

The processing plant may comprise a screen. The screen may be a mobile screen.

The processing plant may have several conveyors according to the first example aspect of the invention connected thereto for transporting material flows exiting or entering the processing plant or inside the processing plant.

Different embodiments of the present invention will be illustrated or have been illustrated only in connection with some aspects of the invention. A skilled person appreciates that any embodiment of an aspect of the invention may apply to the same aspect of the invention and other aspects alone or in combination with other embodiments as well.

BRIEF DESCRIPTION OF THE DRAWINGS

The invention will be described, by way of example, with reference to the accompanying drawings, in which.

DETAILED DESCRIPTION

In the following description, like numbers denote like elements. It should be appreciated that the illustrated figures are not entirely in scale, and that the figures mainly serve the purpose of illustrating embodiments of the invention.

Figure 1:
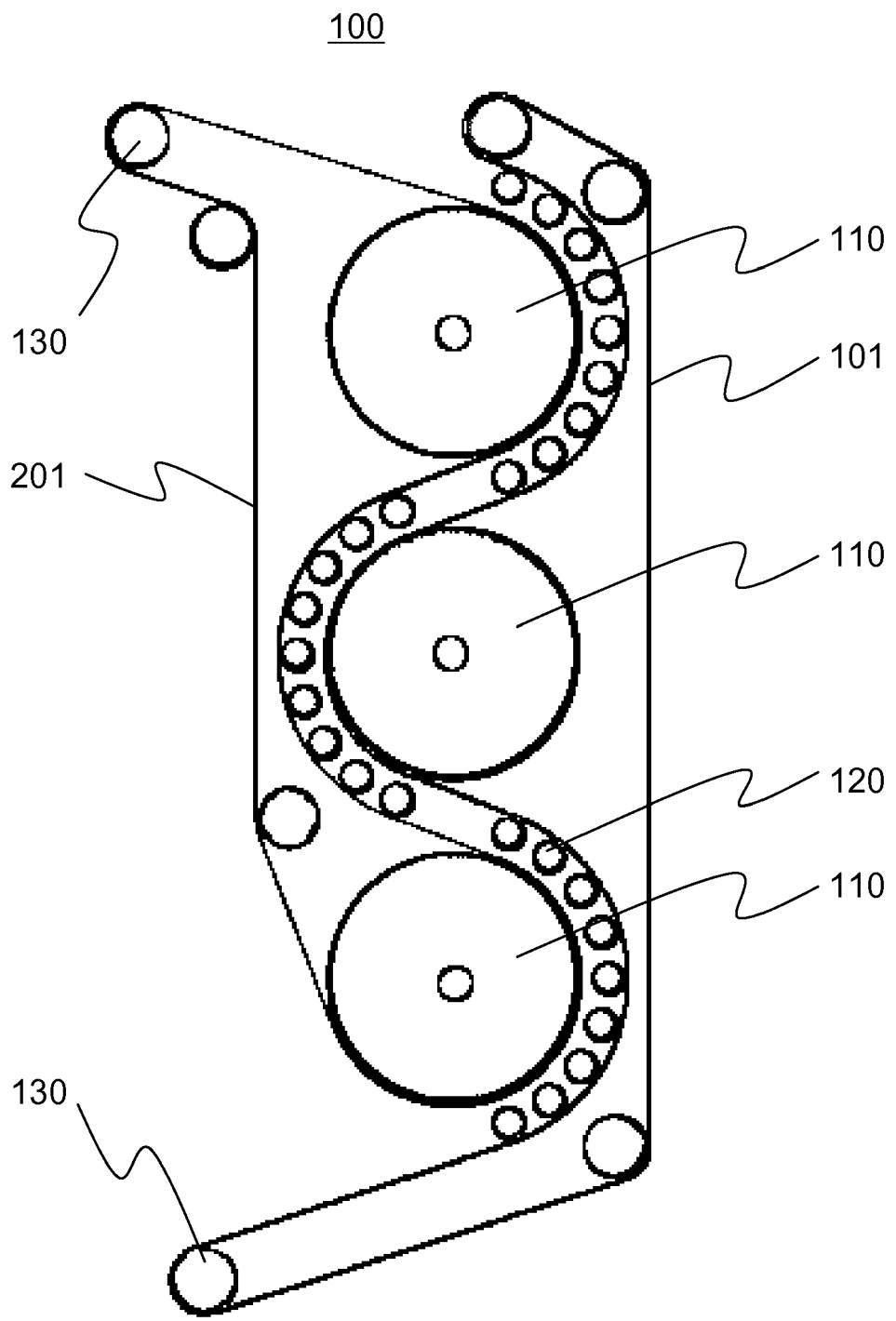
FIG. 1 shows a side view of a vertical conveyor according to an example embodiment.

In FIG. 1, there is presented a vertical conveyor 100 according to an example embodiment. The vertical conveyor 100 comprises a conveyor frame (not shown in FIG. 1) to which the other parts are directly or indirectly attached to. The vertical conveyor 100 further comprises at least two main rolls 110. The main rolls 110 are positioned on top of each other in such a manner that their rotation axes are substantially on the same vertical line with each other. In a further example embodiment, the rotation axis of the main rolls 110 are also horizontally distant from each other in such a way that the horizontal distance between the rotation axis of the main rolls 110 is not substantially larger than the diameter of a single main roll 110. In a further example embodiment the conveyor comprises more than two main rolls 110. One or more of the main rolls 110 are driven with a motor (not shown) or several motors in a conventional manner. If there is provided an even number of main rolls 110, the material to be conveyed leaves the vertical conveyor in the opposite direction compared to the entry direction, and in the same direction compared to entry direction if an odd number of main rolls 110 is provided.

The vertical conveyor 100 further comprises guide rolls 120 and auxiliary rolls 130. In an example embodiment, pairs of guide rolls 120 are positioned next to each main roll 110 in such a manner that each main roll 110 has pairs of guide rolls 120 on one side thereof in the direction perpendicular to the axis of the main roll 110. Furthermore, the pairs of guide rolls 120 are positioned in such a manner that odd and even main rolls 110 have them on different sides in the direction perpendicular to the axis of the main roll 110. The rotation axis of the guide rolls 120 lie on a partial circumference of a circle the center point of which is on the rotation axis of the respective main roll 110. The diameter of the circle is chosen in such a way that the distance between the surface of the guide rolls 120 distal from the main roll 110 and the surface of the main roll 110 is large enough for the pieces of material to be conveyed to pass through. In an example embodiment, the distance is at least twice the largest expected diameter of a piece of material. The number of guide rolls 120 next to each main roll 110 should be large enough to provide a reasonably circular path for the belt supported thereon, for example 9 pairs as shown in FIG. 1. In a further example embodiment, a smaller or a larger number of guide rolls 120, for example 5 to 13 pairs, is provided.

The vertical conveyor further comprises a first 101 and a second 201 endless material transport means, hereinafter referred to as conveyor belts 101,201, having a smooth surface. The belts 101,201 are made of conventional materials and have properties known in the art, for example the belts 101,201 have a certain amount of flexibility. Each belt 101, 201 is supported in turn on a main roll 110 or on several pairs of guide rolls 120. The first 101 and second 201 conveyor belt have substantially the same width. Material of the first 101 and second 201 conveyor belt may be rubber or other elastic material suitable for conveyers of mineral material like stones, ores, sand or gravel.

Figure 2:
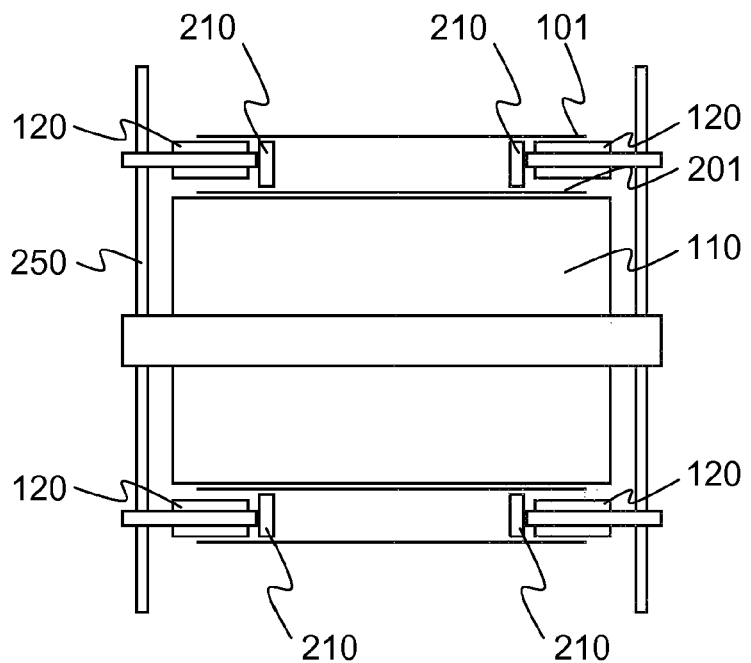
FIG. 2 shows a cross-section of a part of the vertical conveyor according to an example embodiment.

Referring to FIG. 2 showing a cross-section view of the vertical conveyor 100, it can be seen that in an example embodiment the guide rolls 120 are provided as pairs on both sides of the belt supported thereon. Between the guide rolls 120 in the direction of the belt width there is space available for the material to be conveyed. Accordingly, the length of each guide roll 120 necessarily is less than half the width of the belt 101,201.

At the side distal from the conveyor frame or support structure, or the like 250 on both sides of the belts 101,201 is provided a guiding member 210 configured to prevent access of the material to be conveyed between two consecutive guide rolls 120. The guiding member 210 is supported on the end of the guide rolls 120 and positioned between the first 101 and second 201 belt. The guiding member 210 has a width corresponding to the distance between the first 101 and second 201 belt and substantially is formed in such a way that the guiding member extends between the belts 101,201 at least from the first guide roll 120 of a group of guide rolls next to a main roll 110 to the last guide roll of the group of guide rolls 120.

The guiding members 210 are manufactured from a conventional material, for example polyurethane. In an example embodiment, the guiding members 210 have a further function of sealing the space between the belts 101,201 in such a way as to prevent dust and the like from exiting the space limited by the belts 101,201 and the guiding members. Accordingly, no further dust protection is needed. In an example embodiment, for further dust protection, the auxiliary rolls 130 are be positioned in such manner that the first 101 and second 201 belt remain on both sides of the material to be conveyed substantially for the whole length of the vertical conveyer 100.

In an example embodiment, the vertical conveyor 100 has a modular structure. For example one main roll 110 and the corresponding group of guide rolls 120 with the guiding members 210 can comprise one module. In a further example embodiment, the vertical conveyor, or each module thereof, comprises an outer shell or a housing attached to the conveyor frame. The housing of the vertical conveyor 100 encloses the conveyor for added safety and retains the compact structure as the area, even with housing, required to install the vertical conveyor is independent on the required height, and substantially dependent only on the width of the belts and rolls.

Figure 3:
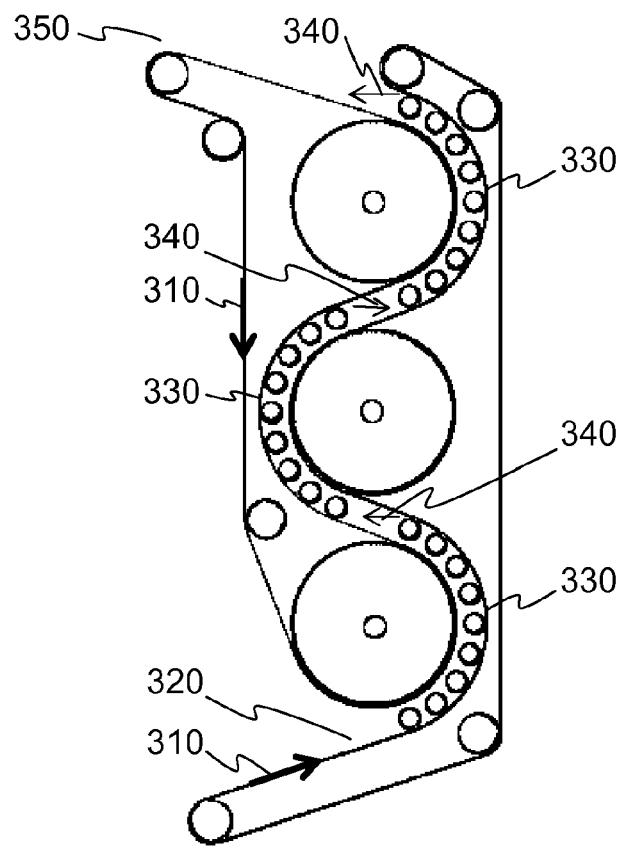
FIG. 3 shows a schematic representation of the operation of the vertical conveyor according to an example embodiment.

FIG. 3 shows a schematic representation of the operation of the vertical conveyor according to an example embodiment. In the following, the operation of the vertical conveyor is explained with reference to FIGS. 1 to 3.

The first belt 101 and the second belt 201 are driven in the direction of the arrows 310 respectively. The belts are driven by rotating the lowest two main rolls 110 with one or several motors in a conventional manner. The speed of both belts 101,201 is the same and accordingly the material conveyed between the belts does not scrape or chafe the surface of the other belt as much as would be the case if the speed of the belts 101,201 was different. However, at the curved sections of the vertical conveyor, i.e. next to the main rolls 110, the angular speed of the belts is different, causing the outer belt to lag behind. Accordingly, in order to avoid unnecessary wear, the distance between the belts is larger than the expected maximum dimension of the parts of material to be conveyed as hereinbefore described. The speed with which the conveyor belts 101,201 are driven depends on the diameter of the circle on the circumference which the guide rolls 120 lie. Said diameter determines how fast the belts need to move in order for the material to be conveyed to remain on the belt supported on the guide rolls due to centrifugal forces. For example, if the main rolls have a diameter of 650 mm and the distance between the belts is 150 mm, the speed has to be substantially at least 2 m/s.

The material to be conveyed enters the vertical conveyor 100 at the lower part 320. The material can be brought to this position in any conventional manner, for example by a horizontal conveyor or directly from a processing machine. At the beginning 320 of the vertical conveyor the material lies at the first belt 101 due to gravity. As the circumference formed by the first group of guide rolls 120 begins, the material still remains in contact with the surface of the first belt 101 due to centrifugal force. Accordingly, the material is conveyed further in contact with the surface of the first belt 101 until it reaches a position 340 at which position gravity overcomes the centrifugal force and the material is propelled away from the surface of the first belt 101 substantially in the direction of the tangent of the surface of the belt 101 at the position 340. The exact position 340 depends e.g. on the diameter of the circle on the circumference of which the guide rolls 120 are positioned and on the speed of the belts 101,201. As the material is propelled away from the first belt 101, it lands on the surface of the second belt 201. Similar operation is repeated as the material is conveyed past each main roll 110.

At the end of the vertical conveyor 100 the material is propelled away from the conveyor in the position 350. The material can for example be dropped to a further conveyor or into processing machinery.

In a normal operation of the vertical conveyor 100, the material only touches one of the belts at any given time thus reducing the wear of the belt surfaces. Should the operation of the vertical conveyor 100 be suspended, on purpose or due to a disturbance, the material being conveyed would fall down at the vertical positions next to the main rolls 110 and pile up below those positions. When the operation commences, the belts 101, 201 due to their flexible properties stretch enough in order to allow the conveyor to restart, i.e. to allow the belts to start moving.

The capacity of the vertical conveyor 100 depends, in addition to conveying speed, on the width of the belts 101, 201, on the distance between the belts 101,201 and on the length of the guide rolls, that is on the cross-sectional area of the "conveying space" defined by the belts 101, 201 and the guiding members 210.

Figure 4:
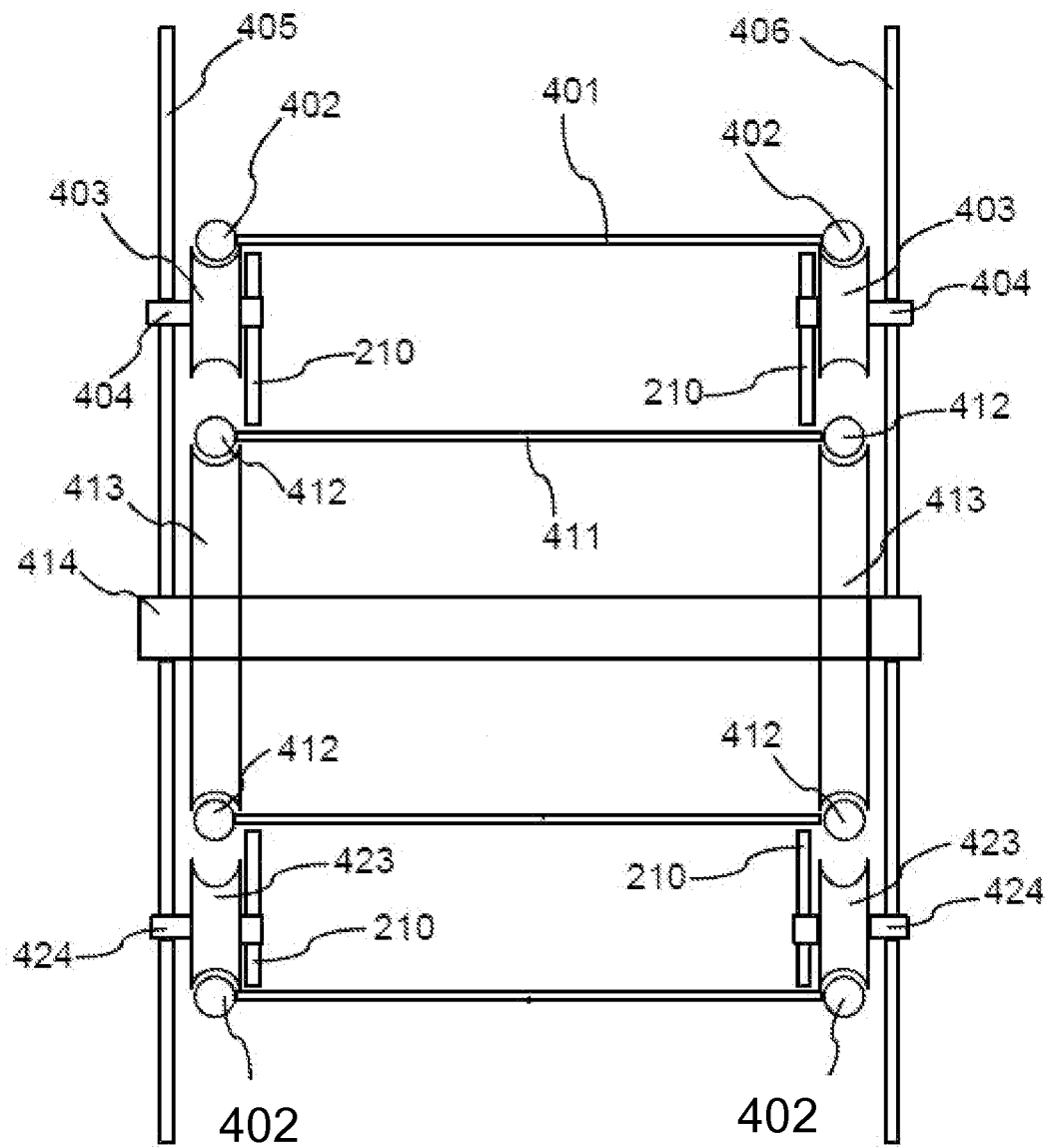
FIG. 4 shows a cross-section of a part of the vertical conveyor according to an example embodiment.

Referring to FIG. 4 showing a cross-section view of the vertical conveyor 400 according to a further example embodiment, the vertical conveyor 400 comprises a first 401 and a second 411 endless material transport means, hereinafter referred to as conveyor cable belts 401, 411 having a smooth surface. The cable belts 401,411 comprise a belt surface supported between drive cables 402,412. The cable belts 401,411 are made of conventional materials and have properties known in the art, for example the belts 401,411 have a certain amount of flexibility. Furthermore, the material of the first 401 and second 411 conveyor cable belt may be rubber or other elastic material suitable for conveyers of mineral material like stones, ores, sand or gravel.

The vertical conveyor 400 further comprises at least two pairs (one pair shown) of main pulleys, or friction drive wheels 413. As with the main rolls 110 of vertical conveyor 100 described hereinbefore, the pairs of main pulleys 413 are positioned on top of each other in such a manner that their rotation axes are substantially on the same vertical line with each other. In a further example embodiment the conveyor comprises more than two pairs of main pulleys, or friction drive wheels, 413. One or more of the pairs of main pulleys, or friction drive wheels, 413 are driven with a motor (not shown) or several motors in a conventional manner. In a further example embodiment, the rotation axis 414 of the main pulleys 413 are also horizontally distant from each other in such a way that the horizontal distance between the rotation axis 414 of the main pulleys 413 is not substantially larger than the diameter of a single main pulley 413.

The vertical conveyor 400 further comprises guide pulleys 403,423 and auxiliary pulleys (not shown). Pairs of guide pulleys 403,423 are positioned next to each main pulley 413 in such a manner that each main pulley 413 has guide pulleys 403,423 on one side thereof in the direction perpendicular to the axis 414 of the main pulleys 413. Furthermore, the guide pulleys 403,423 are positioned in such a manner that odd and even pairs of main pulleys 413 have them on different sides in the direction perpendicular to the axis 414 of the main pulleys 413. The rotation axis 404,424 of the guide pulleys 413 lie on a partial circumference of a circle the center point of which is on the rotation axis of the respective main pulley 413. The diameter of the circle is chosen in such a way that the distance between the surface of the guide pulley 403 distal from the main pulley 413 and the surface of the main pulley 413 is large enough for the pieces of material to be conveyed to pass through. In an example embodiment, the distance is at least twice the largest expected diameter of a piece of material. The number of guide pulleys 403,423 next to each main pulley 413 should be large enough to provide a reasonably circular path for the cable belt 401,411 supported thereon, for example 9 pairs as shown. In a further example embodiment, a smaller or a larger number of guide pulleys 403,423, for example 5 to 13 pairs, is provided.

At the side distal from the conveyor frame or support structure, on both sides of the belts 401,411 is provided a guiding member 210 configured to prevent access of the material to be conveyed between two consecutive guide pulleys 403,423. The guiding member 210 is supported on the end of the guide pulleys 403,423 and positioned between the first 401 and second 411 cable belt. The guiding member 210 has a width corresponding to the distance between the first 401 and second 411 cable belt and substantially is formed in such a way that the guiding member extends between the cable belts 401,411 at least from the first guide pulley 403,423 of a group of guide pulleys next to a main pulley 413 to the last guide pulley 403,423 of a group of guide pulleys.

As described hereinbefore, the guiding members 210 are manufactured from a conventional material, for example polyurethane. Again, the guiding members 210 have a further function of sealing the space between the cable belts 401,411 and further dust protection can be arranged as described hereinbefore with reference to FIG. 2.

The operation of the vertical conveyor corresponds to the operation of the vertical conveyor 400 as hereinbefore described with reference to FIG. 3.

Figure 5:
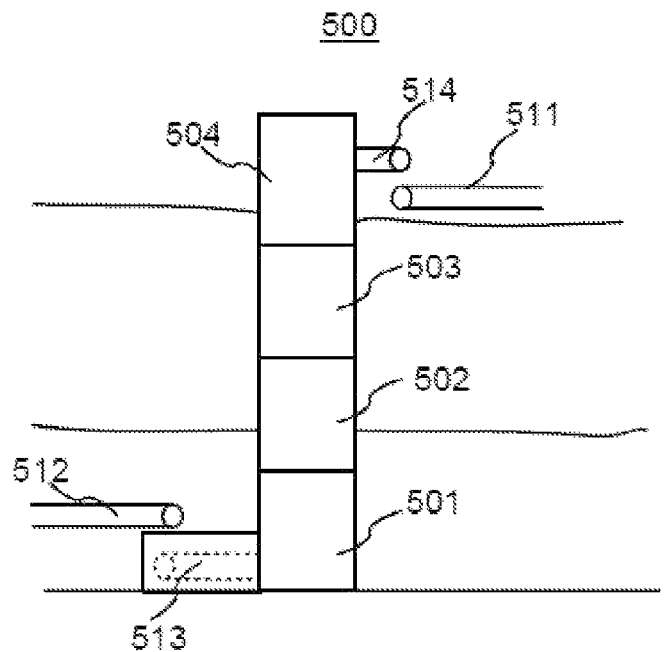
FIG. 5 shows a schematic representation of a system with vertical conveyors having a modular structure according to an example embodiment.

FIG. 5 shows a schematic representation of a system with vertical conveyors having a modular structure according to an example embodiment. Several vertical conveyor 501,502,503,504 having a modular structure as hereinbefore described are stacked to form a large vertical conveyor system 500 or a lift for example in a mine shaft or in an open-pit mine. The material to be lifted a large distance vertically is conveyed with a conventional conveyor 512 and fed into the vertical conveyor system 500 through a feeder hopper 513. The material exits the vertical conveyor system or is thrown therefrom onto a conveyor 514 and is conveyed further with a conveyor 511. The horizontal area needed by the vertical conveyor system 500 is small compared to the vertical distance.

Figure 6:
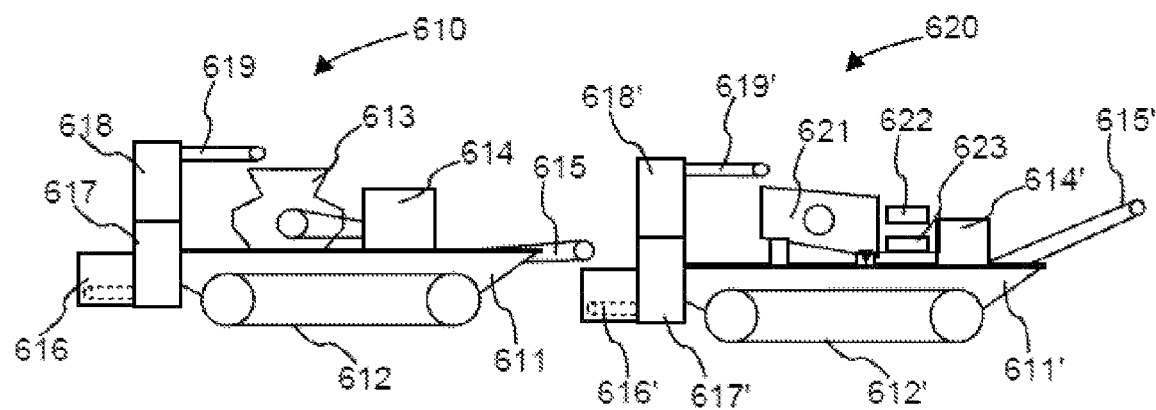
FIG. 6 shows a schematic representation of a processing plant according to an example embodiment.

FIG. 6 shows a schematic representation of a processing plant for mineral material according to an example embodiment. The processing plant comprises a mobile crusher 610, for example a cone crusher, and a mobile screen 620. The mobile crusher comprises a crusher frame 611, tracks 612, a crushing unit 613, a crusher motor 614, an exit conveyor 615, a feeder hopper 616, and a feed conveyor 619. The mineral material to be crushed is raised on to the feed conveyor 619 by one or more vertical conveyors 617,618 according to an example embodiment. The vertical conveyors can have a modular structure as hereinbefore described.

The crushing unit (613) may alternatively be a jaw crusher, a gyratory crusher, an impact crusher, such as horizontal shaft (HSI) or vertical shaft impact (VSI) crusher, a roller grinder, or other suitable crusher type for disintegrating mineral material.

The mobile screen 620 comprises a screen frame 611', tracks 612', a screen motor 614', an exit conveyor 615', a feeder hopper 616', a feed conveyor 619', screening unit 621 and side exit conveyors 622, 623. The mineral material to be screened is raised on to the feed conveyor 619' by one or more vertical conveyors 617', 618' according to an example embodiment. The vertical conveyors can have a modular structure as hereinbefore described. The use of vertical conveyors according to an example embodiment makes it possible to decrease the length of the processing plant, as the horizontal area needed by the vertical conveyors 617,618, 617', 618' is small compared to the vertical conveying distance. Furthermore, the height of the processing plant is decreased, as the vertical conveyors according to an example embodiment need not rise as high as a conventional slanted conveyor.

The screening unit may be for example a vibrating screen with one or several substantially planar or curvilinear screen decks, a drum screen, or other type of screen suitable for disintegrated particles of different size from each other.

The processing plant can be a stationary mineral material processing plant comprising crushing, screening and conveying units or it can be a mobile or a haulable crushing and/or screening plant with crawler tracks, wheels, legs, skids or other suitable support means.

Without in any way limiting the scope, interpretation, or application of the claims appearing below, a technical effect of one or more of the example embodiments disclosed herein is to provide a conveyor capable of conveying material to a large height while minimizing the required horizontal area. Another technical effect of one or more of the example embodiments disclosed herein is to remove the need of external dust protection and to make it possible to easily protect the structure to avoid operator injuries. A further technical effect of one or more example embodiments is to reduce energy consumption by removing the need for several conveyors and the vertical drops in-between. A still further technical effect of one or more of the example embodiments disclosed herein is the provision of a simplified structure and smaller dimensions for a processing plant and more free space around the plant.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A conveyor for conveying mineral material vertically comprising:
    a conveyor frame;
    at least two conveyor main rolls or at least two pairs of conveyor main pulleys being fitted rotatably in connection with the conveyor frame;
    a plurality of conveyor guide rolls or conveyor guide pulleys, each guide roll or pulley being fitted rotatably in connection with the conveyor frame; and
    a first and a second endless conveyor belt being arranged to be moved on the conveyor main rolls and on the conveyor guide rolls, characterized in that the conveyor main rolls or pairs of conveyor main pulleys are arranged on top of each other at a vertical distance from each other in such a way that the horizontal distance between the conveyor main rolls or pairs of conveyor main pulleys is such that at least a part of the conveyor main rolls or conveyor main pulleys is substantially on a same vertical line;
    the conveyor guide rolls or conveyor guide pulleys are arranged outside each conveyor main roll or main pulley at a circumference of a circle having its center point on the rotation axis of the corresponding conveyor main roll or main pulley and having a diameter larger than that of the conveyor main roll or main pulley;
    the first and second endless conveyor belts are arranged to alternate between being moved first on either a conveyor main roll or a pair of conveyor main pulleys or on a group of conveyor guide rolls or guide pulleys and then respectively on a next group of conveyor guide rolls or guide pulleys or a next conveyor main roll or a pair of conveyor main pulleys; and
    the first and second endless conveyor belts are arranged to be moved at such a speed that any material being conveyed stays in contact with the surface of either the first or the second endless conveyor belts when being moved on a group of conveyor guide rolls or guide pulleys.

2. The conveyor according to claim 1, characterized in that at least one guiding member is provided between the first and second endless conveyor belts between a path of the material to be conveyed and the conveyor guide rolls or guide pulleys.

3. The conveyor according to claim 2, characterized in that the at least one guiding member is supported at the ends of a number of guide rolls or guide pulleys (403,423).

4. The conveyor according to claim 1, characterized in that the first and second endless conveyor belts are arranged to be moved at the same speed.

5. The conveyor according to claim 1, characterized in that the first and second endless conveyor belts have the same width.

6. A processing plant for mineral material, characterized in that the processing plant comprises a conveyor according to claim 1.

7. The processing plant according to claim 6, characterized in that the processing plant comprises a crusher.

8. The processing plant according to claim 6, characterized in that the processing plant comprises a screen.

9. The processing plant according to claim 6, characterized in that several conveyors are connected to the processing plant for transporting material flows exiting or entering the processing plant or inside the processing plant.

* * * * *